Oct. 24, 1939.  H. C. PORTER  2,177,536
STRAP JOINT-FORMING TOOL
Filed April 16, 1936  2 Sheets—Sheet 1
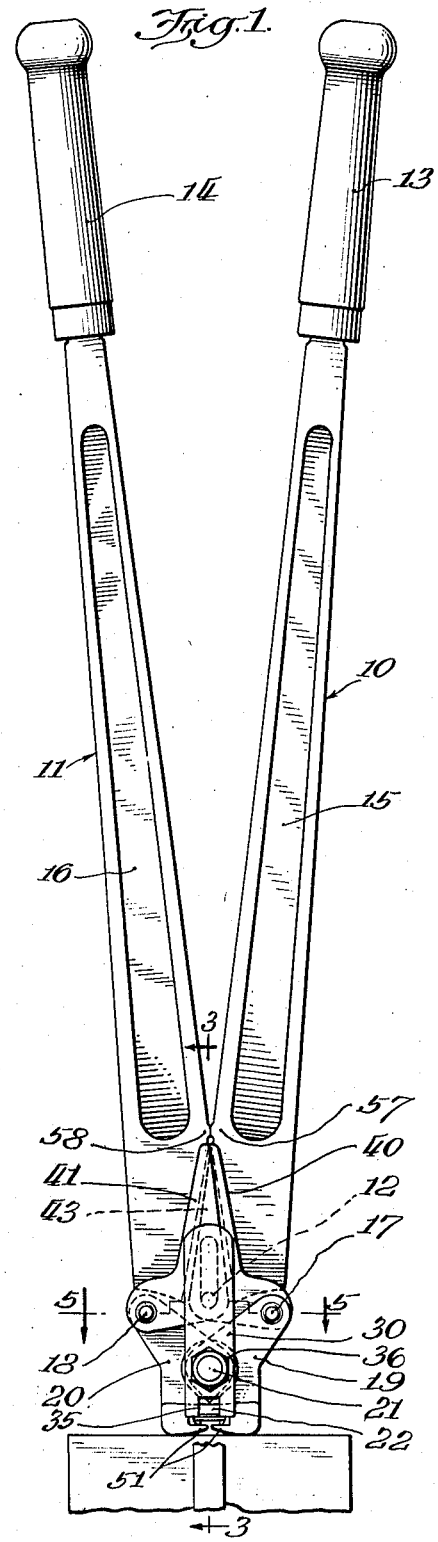
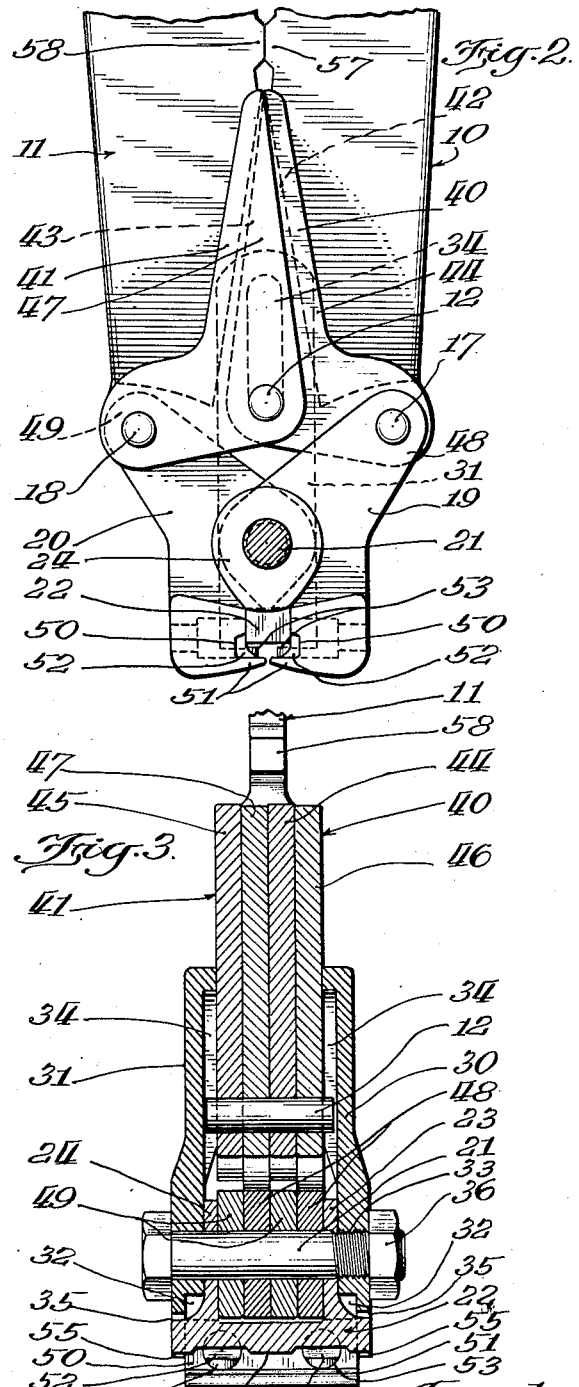
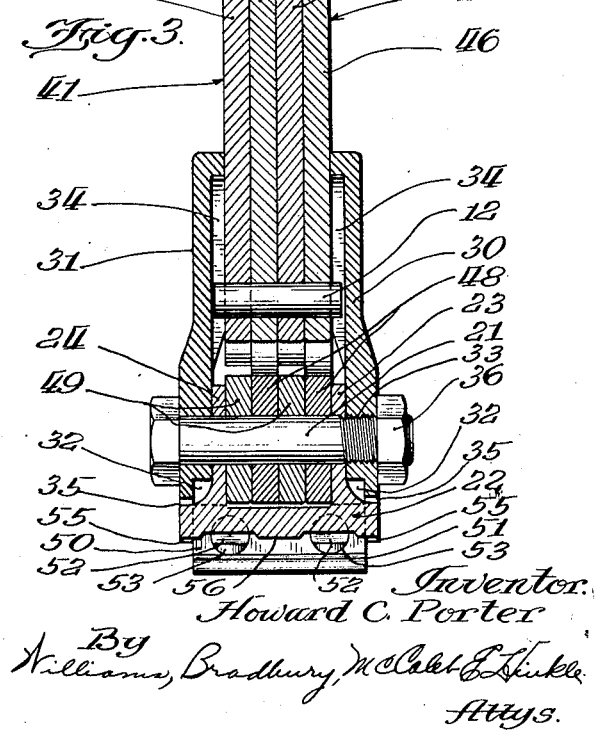
Inventor.
Howard C. Porter
By Williams, Bradbury, McCaleb & Hinkle
Attys.

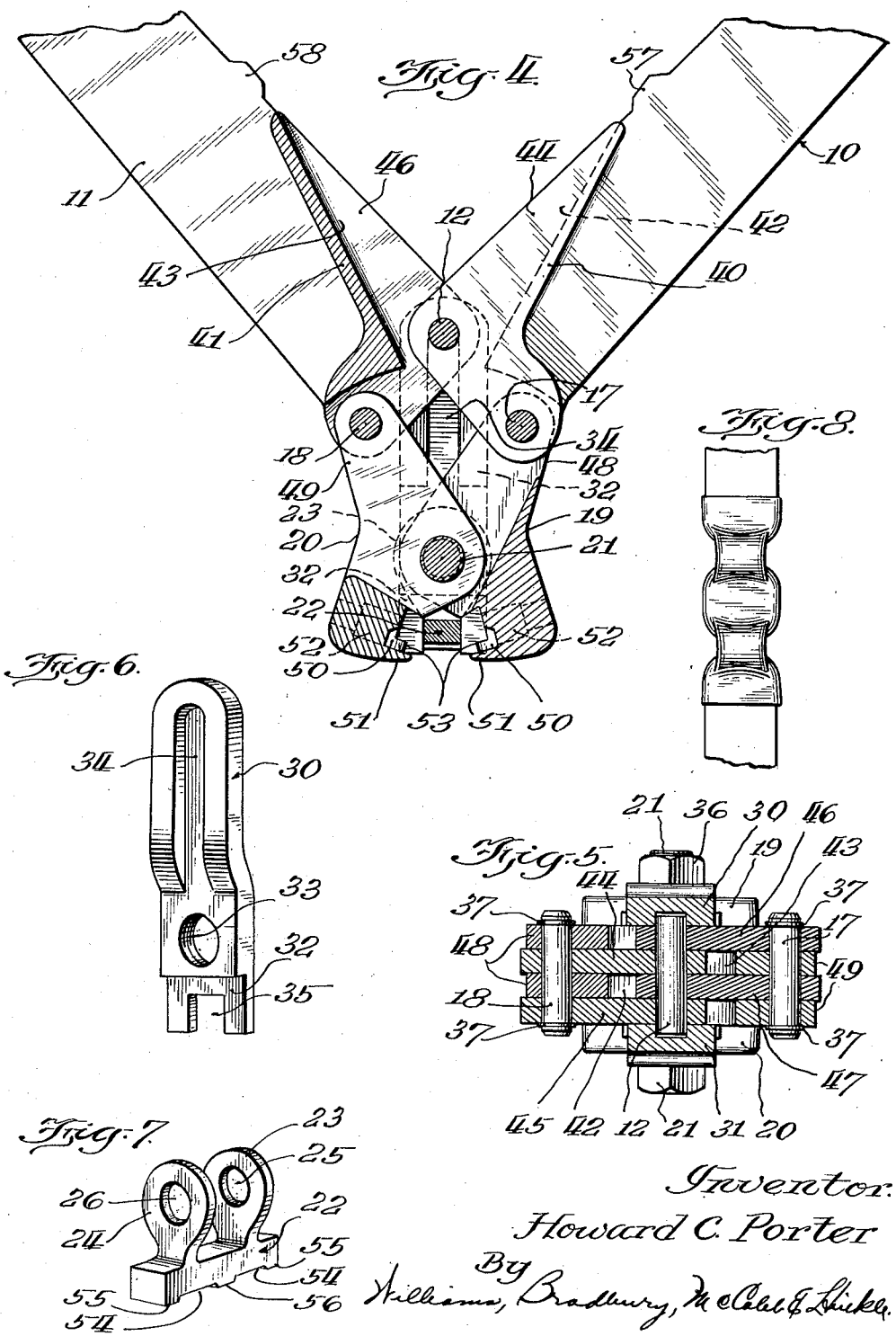

Patented Oct. 24, 1939

2,177,536

UNITED STATES PATENT OFFICE 2,177,536

STRAP JOINT-FORMING TOOL

Howard C. Porter, Chicago, Ill., assignor to Signode Steel Strapping Company, Chicago, Ill., a corporation of Delaware Application April 16, 1936, Serial No. 74,743

2 Claims. (Cl. 81—9.1)

My invention relates to strap joint-forming tools—or, as they are quite generally termed, sealing tools—particularly adapted for producing seal-joints in overlapping portions of tensioned package-binding strap.

One of the objects of my invention is to provide an improved sealing tool.

Another object is to provide a tool which, although relatively light in weight, is strong and rigid and lasting.

A further object is to provide an easily operated, manually actuated tool—i. e., a hand tool—for simultaneously producing a plurality of like, longitudinally contiguous joints to afford a strength greater than that possessed by a single joint.

Other objects and advantages will hereinafter appear.

One embodiment of my invention is illustrated in the accompanying drawings, wherein:

Fig. 1 is a side elevation of the tool;

Fig. 2 is an enlarged side elevation of the jaw end of the tool, with the jaws closed and one side plate removed;

Fig. 3 is an enlarged section on the line 3—3 of Fig. 1;

Fig. 4 is a side elevation similar to Fig. 1, with the jaws open;

Fig. 5 is an enlarged section on the line 5—5 of Fig. 1;

Fig. 6 is a perspective of one of the side and position-gaging plates;

Fig. 7 is a perspective of the chair or anvil that forms an abutment which cooperates with the jaws to deform the overlapping strap ends into a separation-resisting joint; and Fig. 8 is a top plan of a double or tandem joint such as formed by one operation of the tool.

The tool comprises a pair of handle levers 10 and 11 pivotally interconnected adjacent their inner ends by a pin 12 and preferably provided at their outer ends with hand grips 13 and 14, respectively. In order to obtain the desired strength in the direction of the force applied thereto by the operator and delivered thereby to the jaws and at the same time to permit lightness in weight, each handle is made relatively deep in the direction or plane of movement and tapered in depth from the inner end toward the grip, as most clearly shown in Fig. 1, and is relatively thin or narrow transversely of the direction of movement. Lightness may be enhanced by providing either or both sides—preferably both sides—of each handle with a longitudinal hollow or depression 15—16.

At their inner ends handle levers 10 and 11 are pivotally connected by pins 17 and 18 to the rear or outer ends of jaw levers 19 and 20 respectively. Jaw levers 19 and 20 are pivoted upon a bolt 21. Bolt 21 also supports a chair or anvil 22 which, as shown most clearly in Fig. 7, has a pair of rearwardly extending wings 23 and 24 provided with holes 25 and 26 respectively, for the passage of bolt 21. The jaws are flanked by a pair of similar side plates 30 and 31, the construction of which is most clearly shown in Fig. 6, which are likewise carried by jaw pivot bolt 21. As shown, the rear portions of the side plates are offset laterally from the forward portions so as to enable them to fit closely against both the handles and the chair wings, and they are each provided with a recess 32 to accommodate the ends of the jaws. Side plate 30 has a threaded bolt-receiving hole 33, the threads of which conform to the threads of the bolt, whereas the bolt-receiving hole of side plate 31 is not threaded. Each side plate has a straight groove 34 in its inner face to provide guideways for the opposite projecting ends of handle pivot pin 12, as most clearly shown in Fig. 3. The outer end of each side plate is provided with a notch 35 for rather tightly receiving the projecting ends of chair 22, as shown most clearly in Fig. 3. Thus the side plates laterally support or brace and centralize the chair between the confronting faces of the jaws. A lock nut 36 may be threaded upon the end of bolt 21 against side plate 30 to retain the assembly tightly together. Pivot pins 17 and 18 may be retained in place by grooving them adjacent their ends and applying split-spring retaining washers 37 thereto. Handle pivot pin 12 is retained in place by the side plates 30 and 31.

Adjacent the inner or pivot end each handle lever is formed with an upwardly tapering thickened portion or boss 40—41 respectively. These bosses are arranged predominantly upon one side—preferably the outer side—of the associated handle and are longitudinally slotted to provide inwardly opening tapering recesses 42 and 43 respectively, in the confronting edges of the handles and parallel-sided tapering spaced webs 44—45 and 46—47. The recesses or slots 42 and 43 are laterally offset or staggered so that the web 44 of handle 10 registers with the slot 43 in handle 11, and the web 47 of handle 11 registers with the slot 42 in handle 10. Thus, the web 44 of handle 10 is interposed between the webs 46 and 47 of handle 11, and web 47 of handle 11 is interposed between the webs 44 and 45 of handle 10. In other words, the handles telescopically overlap in a plurality of planes or, in effect, mesh one within the other adjacent and above the pivot, and as the handles are closed to form a joint there are four overlapping and mutually supporting or laterally stiffened layers of metal adjacent the handle fulcrum; and, because the webs telescope into the corresponding confronting recess, the length of that multiple overlap from the fulcrum and its total area increase as the handles approach each other. As the handles are closed during the operation of the tool, the inner ends mesh progressively toward the grip ends and mutually cooperate in both lateral directions to keep each in line with the other, to resist the tendency of the operator to twist the tool handles and to relieve the pivots and jaws from the offset strains occasioned by the inherent tendency of the operator to twist the tool about a vertical axis as pressure is required to form a joint. The result is that even the thinner handles do not break as readily, lighter pivot pins and bolts can be used, and less wear will be experienced between pins and bolts and the handle levers and jaws, because the twisting strain thereon is reduced and effectively resisted by the outwardly progressive meshing together or multiple overlapping of the lower ends of the handle levers. The slots 42 and 43 also serve to bifurcate the ends of the handle levers so that the ends thereof overlap each other at their common pivot pin 12. And by likewise bifurcating the inner ends of the jaw levers, to provide spaced wings 48 and 49 respectively, the inner ends of the associated handle and jaw levers may be overlapped at pivot pins 17 and 18 and the jaw levers may be overlapped at pivot bolt 21. In this manner the strains communicated between the moving elements are centralized and the shearing stresses upon the pivot pins and bolts are distributed.

In order to produce a double tandem joint such as shown in Fig. 8, each jaw within the recess 50 back of its tip 51, is equipped with two forming pins 52,—each provided with a forming nose 53. The chair or anvil 22 is correspondingly formed with two depressed seats 54, two projecting end lugs 55 at opposite ends thereof, and a central upstanding lug 56 between the two seats. The forming pins in one jaw are located opposite the pins in the other jaw and the two opposite sets of forming pins lie in line with the centers of the two chair seats. When the handles are closed and the jaws are caused to approach each other, the tips of the jaws are forced under the overlapping strap ends, tucking thereabout the reinforcing sleeve if one is used, and the forming pins engage opposite edges of and deform the strap by edgewise crimping pressure. The handles may, if desired, be provided with cooperating stop lugs 57 and 58 respectively, to limit the approach of the handles. Heretofore trouble has been experienced in insuring proper engagement of such stop lugs because skewing of the handles would force them out of alignment. But with the multiple handle-mesh heretofore described this difficulty is overcome. The action of such stops can, moreover, be supplemented by the webs 44 and 47 contacting the bottoms of the corresponding recesses 43 and 42 respectively, so that the relatively small contacts between the stop lugs will not be battered and worn by the impacts which occur at the completion of the joints.

When constructed as shown and herein described, both handles of the tool are alike and both jaws are also alike,—there is no necessity for making them rights and lefts. The side plates tightly support the handles to insure proper functioning of the multiple mesh therebetween, and since those plates are held in place by a single screw bolt and lock nut, assembly, take-up and adjustment are easily and quickly effected.

Having illustrated and explained the nature and a typical embodiment of my invention, what I claim and desire to secure by United States Letters Patent is as follows:

I claim:

1. A joint-forming tool for metal strap comprising a pair of elongated metal handle members having handles at one end and having thickened portions at the opposite end, the opposite ends being laterally slotted and each end being provided with a pair of pintle apertures located at the opposite sides of said handle members, the slotted portions of said handle members being overlapped and two of said pintle apertures registering, a first pintle in said latter apertures for pivotally securing said handle members together, a pair of jaw members, each jaw having jaw means for confining a strap embracing clip between said jaws, and means for deforming a strap and clip upon approaching movement of said jaw members, said jaw members having a pair of registering bearing apertures and a second pintle in said latter apertures, a chair pivotally mounted on said latter pintle and located inwardly of said jaws to engage one side of said strap and clip, said jaw members having outwardly extending actuating arms provided with pintle apertures, and each jaw member being pivotally connected to one of said handle members by a third and fourth pintle, respectively, and centering members for said chair comprising a pair of metal members pivotally mounted on said second pintle on the opposite sides of said tool, said centering members having oppositely disposed surfaces engaging opposite sides of said chair at each end thereof, and each centering member having an inwardly directed groove receiving the projecting portions of said first pintle, whereby said centering members are maintained in alignment with each other, said chair is maintained in middle position between said jaw members, and the first pintle is confined in its pintle apertures.

2. A joint-forming tool for metal strap comprising a pair of elongated metal handle members having handles at one end and having thickened portions at the apposite end, the opposite ends being laterally slotted and each end being provided with a pair of pintle apertures located at the opposite sides of said handle members, the slotted portions of said handle members being overlapped and two of said pintle apertures registering, a first pintle in said latter apertures for pivotally securing said handle members together, a pair of jaw members, each jaw having jaw means for confining a strap embracing clip between said jaws, and means for deforming a strap and clip upon approaching movement of said jaw members, said jaw members having a pair of registering bearing apertures and a second pintle in said latter apertures, a chair pivotally mounted on said latter pintle and located inwardly of said jaws to engage one side of said strap and clip, said jaw members having outwardly extending actuating arms provided with pintle apertures, and each jaw member being pivotally connected to one of said handle members by a third and fourth pintle, respectively, and centering members for said chair comprising a pair of metal members pivotally mounted on said second pintle on the opposite sides of said tool, said centering members having oppositely disposed surfaces engaging opposite sides of said chair at each end thereof, and each centering member having an inwardly directed groove receiving the projecting portions of said first pintle, whereby said centering members are maintained in alignment with each other, said chair is maintained in middle position between said jaw members, and the first pintle is confined in its pintle apertures, the said means for deforming said strap and clip comprising opposite headed dies having shanks secured in said jaw members and having laterally curved clip engaging surfaces, said chair having depressed seats on the face thereof for the formation of tandem joint deformations in said strap and clip.

HOWARD C. PORTER.